(12) United States Patent
Lee

(10) Patent No.: US 9,215,187 B2
(45) Date of Patent: Dec. 15, 2015

(54) PACKET TRANSPORT SYSTEM AND TRAFFIC MANAGEMENT METHOD THEREOF

(75) Inventor: Won Kyoung Lee, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 474 days.

(21) Appl. No.: 13/620,185

(22) Filed: Sep. 14, 2012

(65) Prior Publication Data

US 2013/0163418 A1 Jun. 27, 2013

(30) Foreign Application Priority Data

Dec. 23, 2011 (KR) ........................ 10-2011-0141155

(51) Int. Cl.
| | | |
|---|---|---|
| *H04L 12/28* | (2006.01) | |
| *H04L 12/873* | (2013.01) | |
| *H04L 12/835* | (2013.01) | |
| *H04L 12/815* | (2013.01) | |
| *H04L 12/851* | (2013.01) | |
| *H04L 12/823* | (2013.01) | |

(52) U.S. Cl.
CPC .............. *H04L 47/522* (2013.01); *H04L 47/30* (2013.01); *H04L 47/22* (2013.01); *H04L 47/24* (2013.01); *H04L 47/32* (2013.01)

(58) Field of Classification Search
USPC ........... 370/229, 230, 235, 235.1, 252, 395.4, 370/395.41, 412–418
See application file for complete search history.

(56) References Cited

U.S. PATENT DOCUMENTS

| | | | |
|---|---|---|---|
| 6,888,824 B1 | 5/2005 | Fang et al. | |
| 7,324,535 B1 * | 1/2008 | Goss et al. | 370/411 |
| 7,974,208 B2 | 7/2011 | Brewer et al. | |
| 8,175,093 B2 * | 5/2012 | Busch | 370/389 |
| 2002/0105908 A1 * | 8/2002 | Blumer et al. | 370/230 |
| 2005/0083928 A1 * | 4/2005 | Sivabalan et al. | 370/389 |
| 2006/0215551 A1 * | 9/2006 | Narvaez et al. | 370/229 |
| 2006/0251091 A1 * | 11/2006 | Terauchi | 370/412 |
| 2007/0053352 A1 * | 3/2007 | Corcoran | 370/389 |
| 2007/0070907 A1 * | 3/2007 | Kumar et al. | 370/235 |
| 2009/0141732 A1 * | 6/2009 | Woo et al. | 370/412 |
| 2009/0190605 A1 * | 7/2009 | Andersen | 370/412 |
| 2012/0016986 A1 * | 1/2012 | Jacquet et al. | 709/224 |
| 2013/0094365 A1 * | 4/2013 | Soffer | 370/236 |
| 2014/0146827 A1 * | 5/2014 | Nordmark et al. | 370/401 |

* cited by examiner

*Primary Examiner* — Kwang B Yao
*Assistant Examiner* — Nguyen Ngo
(74) *Attorney, Agent, or Firm* — Nelson Mullins Riley & Scarborough LLP; Anthony A. Laurentano, Esq.; Michael Malone, Esq.

(57) ABSTRACT

A method of managing traffic of packet transport system according to some embodiments of the inventive concept may include calculating an average queue size of input traffic with reference to a link capacity; and differently applying allowable length and probability of disuse with respect to the calculated average queue size according to marking information with respect to packets of the input traffic. The input traffic includes a CCM packet for OAM.

8 Claims, 9 Drawing Sheets

PACKET TRANSPORT SYSTEM AND TRAFFIC MANAGEMENT METHOD THEREOF

CROSS-REFERENCE TO RELATED APPLICATIONS

This U.S. non-provisional patent application claims priority under 35 U.S.C. §119 of Korean Patent Application No. 10-2011-0141155, filed on Dec. 23, 2011, the entire contents of which are hereby incorporated by reference.

BACKGROUND

The present inventive concept herein relates to communication networks, and more particularly, to a traffic manager of packet transport system located at a backbone network or a core network and a traffic management method thereof.

As a requirement for bandwidth in a communication network rapidly increases, a today's network is developing into a more simple and efficient structure. In this situation, the core network and the backbone network is being replaced with a packet transport platform from a synchronous digital hierarchy (SDH)/synchronous optical network (SONET). A transport system delivering all kinds of services including voice service through a packet transport network is commonly called a packet transport system. The packet transport system is based on a packet transport technology of, for example, PBB-TE (IEEE 802. 1Qay) and MPLS transport profile (MPLS-TP).

A packet transport technology based on PBB-TE or MPLS-TP should provide functions of a system stability that can guarantee reliability of network, a service protection that can guarantee a survival of network, a network OAM (Operation, Administration, and Maintenance), etc. Thus, the packet transport system in a connection-oriented packet transport network should be able to operate functions of a packet forwarding based on PBB-TE or MPLS-TP, QoS, OAM, Protection, etc. at the same time. Those functions should not affect performance of other functions. That is, in a packet transport system, a packet processing ratio/an error rate, QoS accuracy, OAM stability, a protection switching time, etc. should be guaranteed independently of each other.

In the case that a packet transport system supports those functions at the same time, according to a conventional technology, there is a problem that a packet processing ratio is seriously reduced and an error rate is increased.

SUMMARY

Embodiments of the inventive concept provide a method of managing traffic of packet transport system. The method may include calculating an average queue size of input traffic with reference to a link capacity; and differently applying allowable length and probability of disuse with respect to the calculated average queue size according to marking information with respect to packets of the input traffic. The input traffic includes a CCM packet for OAM.

Embodiments of the inventive concept also provide a packet transport system. The packet transport system may include a queue level selector calculating an average queue size of input traffic with reference to a link capacity to select a queue level; a global synchronization avoidance block differently applying allowable length and probability of disuse with respect to the calculated average queue size according to marking information with respect to packets of the input traffic; and a traffic congestion avoidance block selecting the packets to a queue level corresponding to a physical port when the input traffic corresponds to a hierarchical queue.

BRIEF DESCRIPTION OF THE FIGURES

Preferred embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION OF THE EMBODIMENTS

Figure 1:
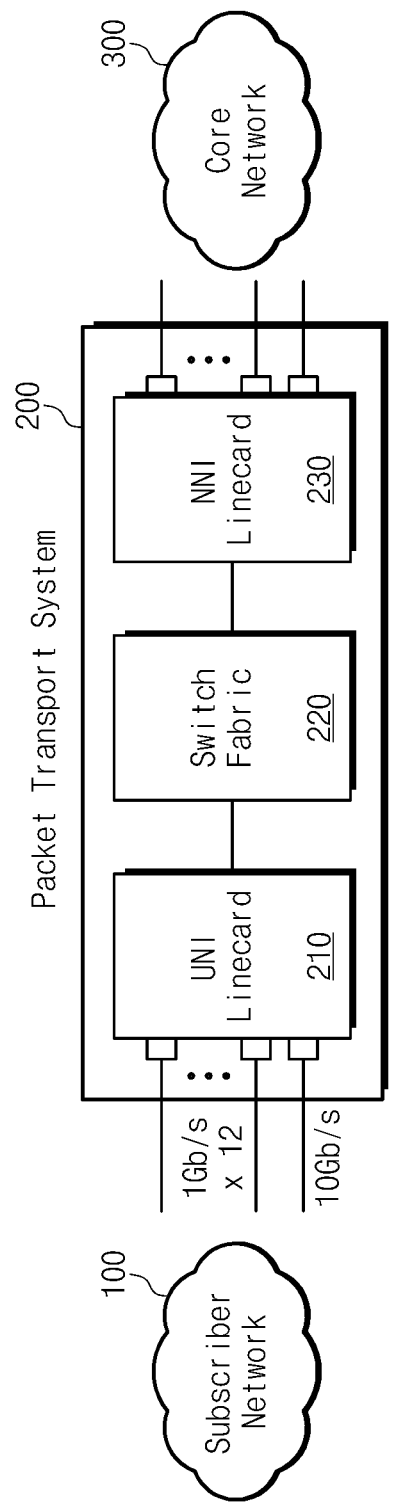
FIG. 1 is a block diagram illustrating a structure of packet transport system.

Embodiments of inventive concepts will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

FIG. 1 is a block diagram illustrating a structure of packet transport system. Referring to FIG. 1, a packet transport system 200 is located at an edge position connecting a subscriber network 100 and a core network 300.

The subscriber network 100 may be constituted by general packet processing equipment such as L2 Ethernet switch, L3 router, etc.

The core network 300 may be a connection-oriented network based on a provider backbone bridge traffic engineering (PBB-TE) or multiprotocol label switching-transport profile (MPLS-TP).

The packet transport system 200 is a packet-based transport system and arbitrates a packet exchange between the subscriber network 100 and the core network 300. The packet transport system 200 includes a user-network interface (UNI) line card 210, a switch fabric 220 and a network-network interface (NNI) line card 230.

The UNI line card 210 receives customer frames provided from the subscriber network 100 to transmit the frames to the switch fabric 220. The switch fabric 220 may be constituted by a chip or chip set based on application specific standard product (ASSP) which can exchange data between several line cards regardless of a protocol. Data transmission is performed between the UNI line card 210 and the NNI line card 230 by the switch fabric 220. The NNI line card 230 adds a B-TAG of PBB-TE or label of MPLS-TP based on corresponding tunnel information to the frame received from the switch fabric 220 to transmit it to corresponding output port. An interface of line cards 210 and 230 may be constituted by ports having various link capacity of 1 Gb/s, 10 Gb/s, 10/100/1000 Mbps, etc.

Figure 2:
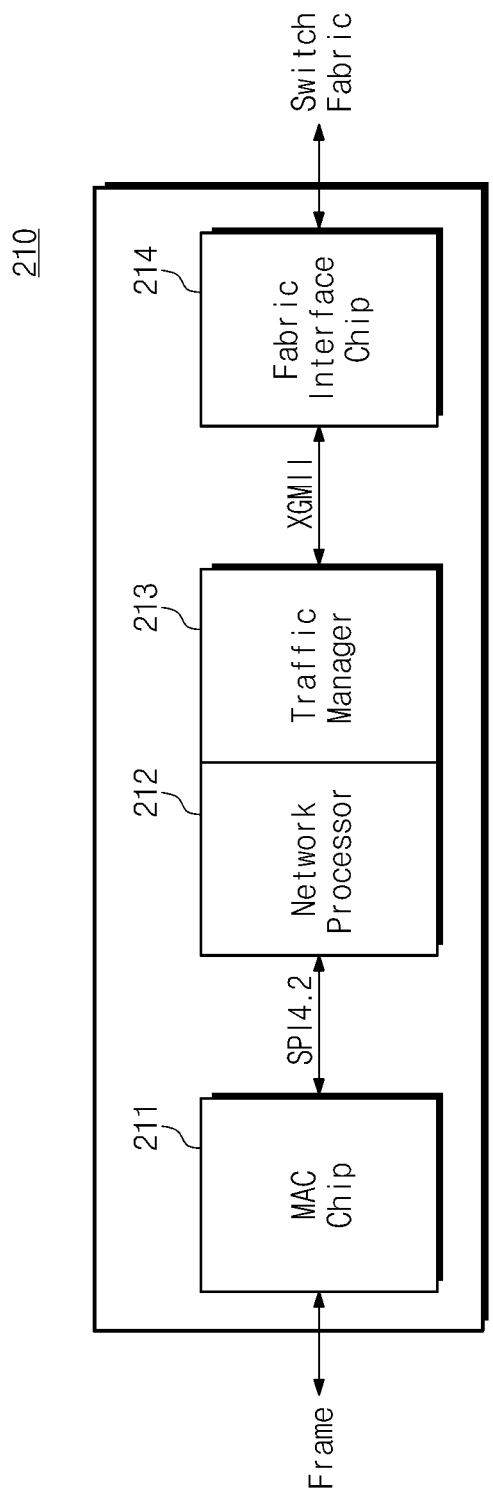
FIG. 2 is a block diagram illustrating a constitution of line card.

FIG. 2 is a block diagram illustrating a constitution of line card. Referring to FIG. 2, one line card 210 or 230 includes a medium access control (MAC) chip 211, a network processor 212, a traffic manager 213 and a fabric interface chip 214.

The MAC chip 211 receives a frame and transmits it to the network processor 212 according to a MAC protocol. At this time, SPI 4.2 may be used as a packet interface between the MAC chip 211 and the network processor 212.

The network processor 212 parses a frame received from the MAC chip 211 and performs a function of PBB-TP or MPLS-TP. The PBB-TP supports a function of providing stability, efficiency and extension which are essential to support a packet transport network. The MPLS-TP is a new transmission infrastructure technology to take a profile which is necessary for transmission and improve a function of OAM and a protection while maintaining MPLS architecture.

The traffic manager 213 performs a traffic control operation. The traffic manager 213 classifies frames on the basis of queue and performs function of congestion avoidance, queuing, scheduling, etc.

The fabric interface chip 214 performs a function of interface for transmitting a frame processed by the network processor 212 or the traffic manager 213 to the switch fabric 220. XGMII (medium independent connection interface) may be used as an interface between the fabric interface chip 214 and the network processor 212 or between the fabric interface chip 214 and the traffic manager 213.

Figure 3:
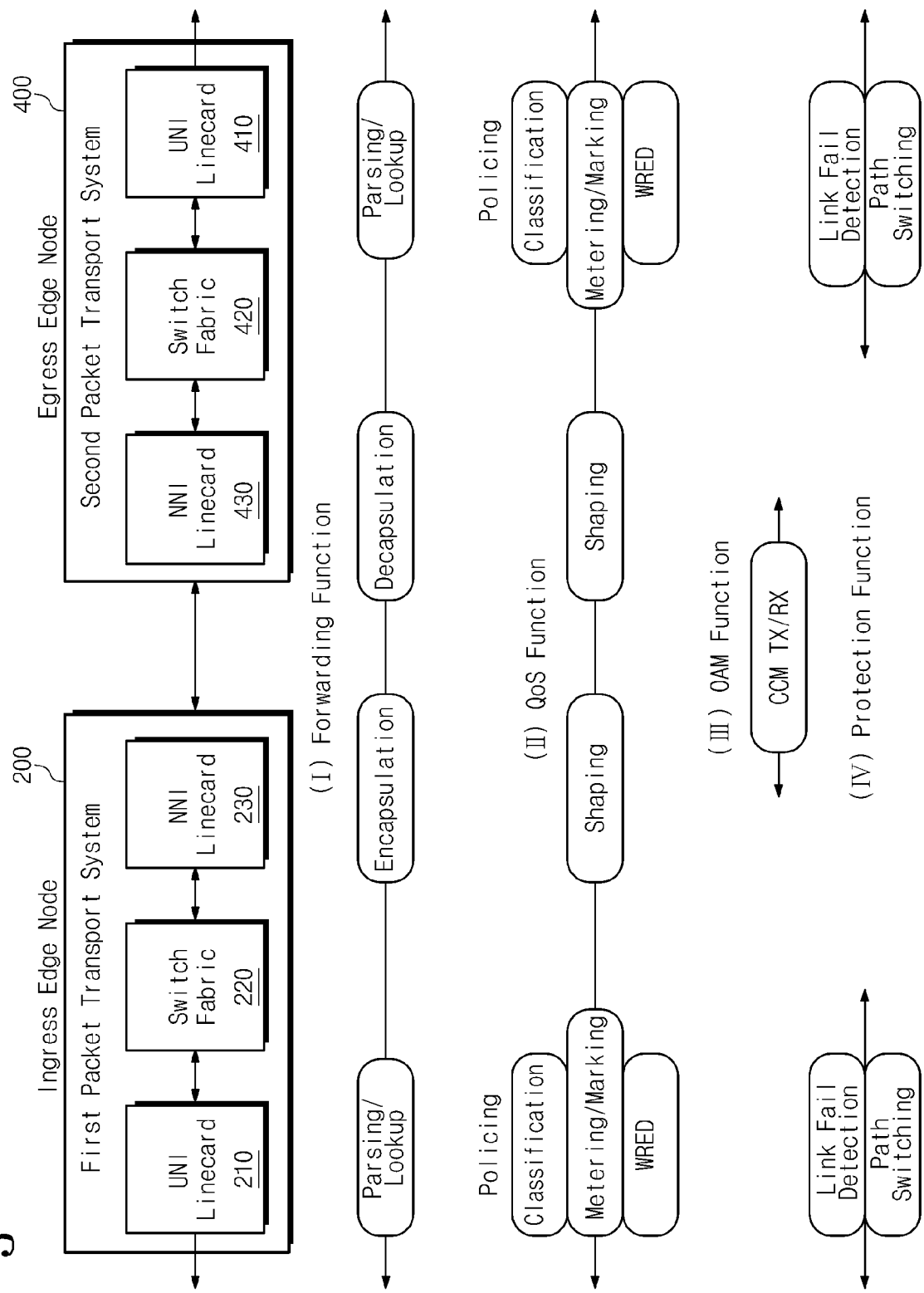
FIG. 3 is a drawing illustrating functions embodied in a line card.

FIG. 3 is a drawing illustrating various functions embodied in a line card. Referring to FIG. 3, a first packet transport system 200 constituting an ingress edge node and a second packet transport system 400 constituting an egress edge node are illustrated. The first packet transport system 200 includes the user-network interface (UNI) line card 210, the switch fabric 220 and the network-network interface (NNI) line card 230 as illustrated in FIG. 1. The second packet transport system 400 includes a user-network interface (UNI) line card 410, a switch fabric 420 and a network-network interface (NNI) line card 430.

In (I) of FIG. 3, a forwarding function is illustrated. The forwarding function includes a function of parsing information of received customer frames. The forwarding function includes a function of lookup that corresponding tunnel information is founded by searching a lookup table using the parsed information. The UNI line card 210 constituting the ingress edge node can perform the function of parsing and lookup. The NNI line card 230 constituting the ingress edge node can perform the function of encapsulating a tag (B-TAG of PBB-TE or label of MPLS-TP) of corresponding tunnel searched by a look-up function. The NNI line card 230 transmits the encapsulated packet to the NNI line card 430 constituting the egress edge node. The NNI line card 430 decapsulates the packet encapsulated in the NNI line card 230 of the ingress edge node to I-tagged frames. The NNI line card 430 decapsulates the received PBB-TE packet (IEEE 802.1Qay) or MPLS-TP packet (RFC 5960) and the UNI line card 410 restores the I-tagged packet to a subscriber frame. The forwarding function is distributed in all of the UNI line cards 210 and 410 and the NNI line cards 230 and 430.

In (II) of FIG. 3, a quality of service (QoS) function for guaranteeing reliability is illustrated. Examples of the quality of services (QoS) are policing, shaping, etc. In the polishing, there are classification, metering/marking, congestion avoidance, etc. The marking means a function of dividing traffic into 'conformation', 'excess' and 'violation', and then marking the divided traffics with colors of 'green', 'yellow' and 'red'. The congestion avoidance means a function of discarding the traffic marked with red color when congestion of traffic occurs. The polishing function is distributed in the UNI line cards 210 and 410 and the shaping function with respect to a tunnel is distributed in the NNI line cards 230 and 430.

In (III) of FIG. 3, an OAM function with respect to a tunnel for guaranteeing survival of network is illustrated. The OAM function relates to transmission and reception of continuity check messages (CCM) and is distributed in the NNI line cards 230 and 430.

In (IV) of FIG. 3, a protection function is illustrated. The protection function includes a function of detecting a link fail and a function of switching a tunnel path. The protection function is distributed in UNI line cards 210 and 410.

However, when operating several functions described above at the same time, a problem may occur that a processing rate of forwarding of packet decreases and an error rate increases. The problem becomes serious when a function is added and a processing speed is high. If applying traffic more than link capacity, the forwarding may be stopped.

Figure 4:
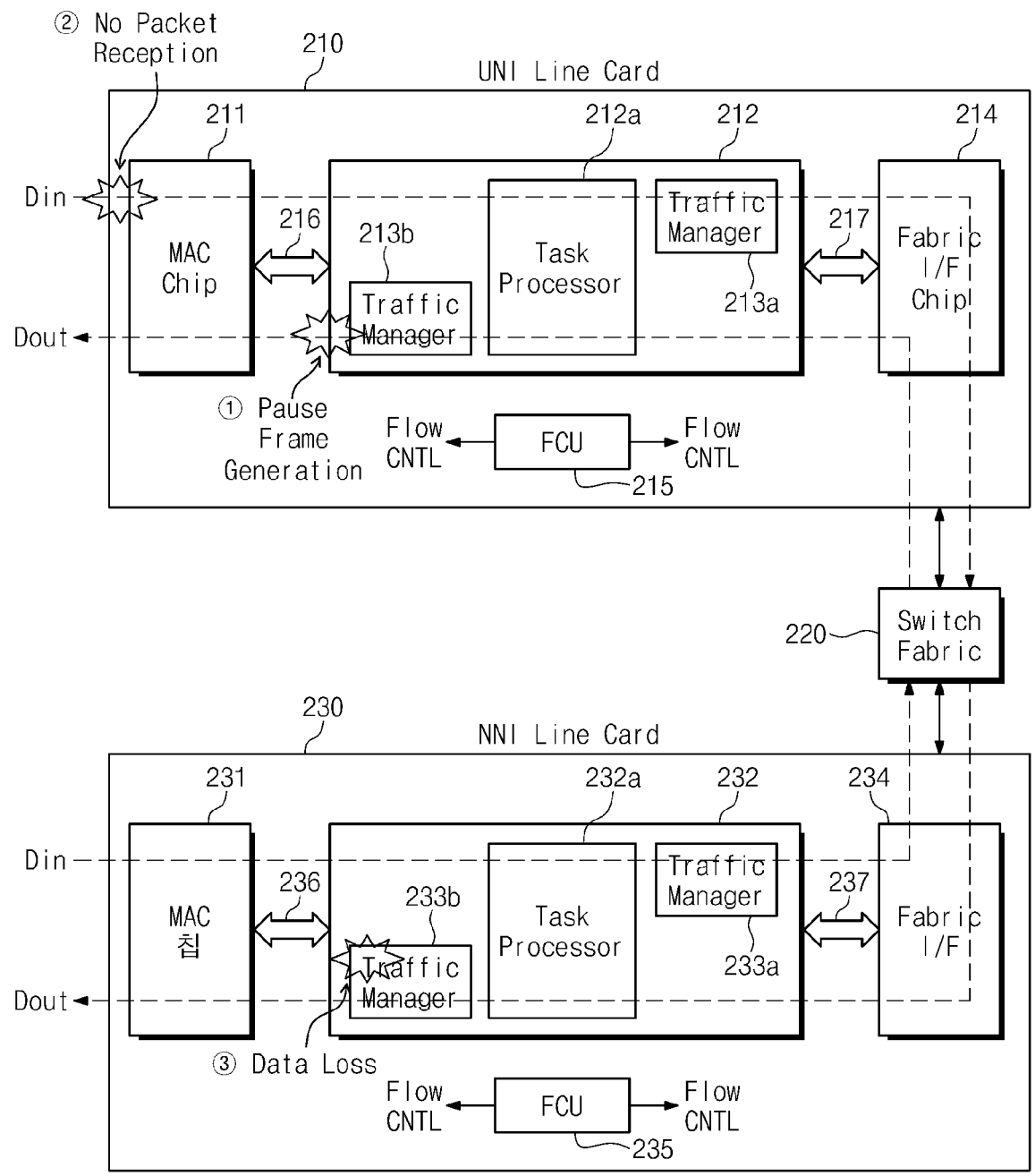
FIG. 4 is a block diagram explaining the cause why performance is degraded in a line card.

FIG. 4 is a block diagram explaining the cause why performance is degraded in a line card. Referring to FIG. 4, UNI line card 210, switch fabric 220 and NNI line card 230 constituting one edge node are illustrated.

The UNI line card 210 includes the MAC chip 211, the network processor 212 and the fabric interface chip 214 as described above. The network processor 212 may include a task processor 212a, traffic managers 213a and 213b and a flow control unit (FCU) 215.

The NNI line card 230 includes the MAC chip 231, the network processor 232 and the fabric interface chip 234. The network processor 232 may include a task processor 232a, traffic managers 233a and 233b and a flow control unit (FCU) 235.

When more traffics than link capacity are applied, performance of line card may be degraded. The flow control unit 215 of the UNI line card 210 generates a pause frame for limiting a transmission of data frame for a specific time due to an excess traffic. That state is illustrated by a quotation mark ①. The MAC chip 211 cuts off an additional packet reception in response to a generation of the pause frame. That state is illustrated by a quotation mark ②. When a CCM packet for OAM function is bidirectionally transmitted in the NNI line card 230, a data packet may be damaged by the traffic manager 233b of the NNI line card 230.

In some embodiments of the inventive concept, a cause degrading performance of the packet transport system can be analyzed and solved. The first cause that a processing rate of packet forwarding decreases and an error rate increases is a global synchronization between data and CCM packet which is the control packet for OAM. The data and the CCM packet are synchronized with each other, therefore, CCM packet of high priority is transmitted but data is discarded as much as the number of CCM packets. According to some embodiments of the inventive concept, to transmit all the data packets and CCM packets without loss by cutting off the synchronization, parameters of the traffic manager should be optimized.

Traffic manager has developed various methods to avoid the traffic congestion. In early days, a method of random drop or drop tail has been used but the method has a disadvantage that it causes a global synchronization and thereby a great loss may occur. To overcome the disadvantage, a random early drop (RED) and a weighted random early drop (WRED) have been suggested.

Figure 5:
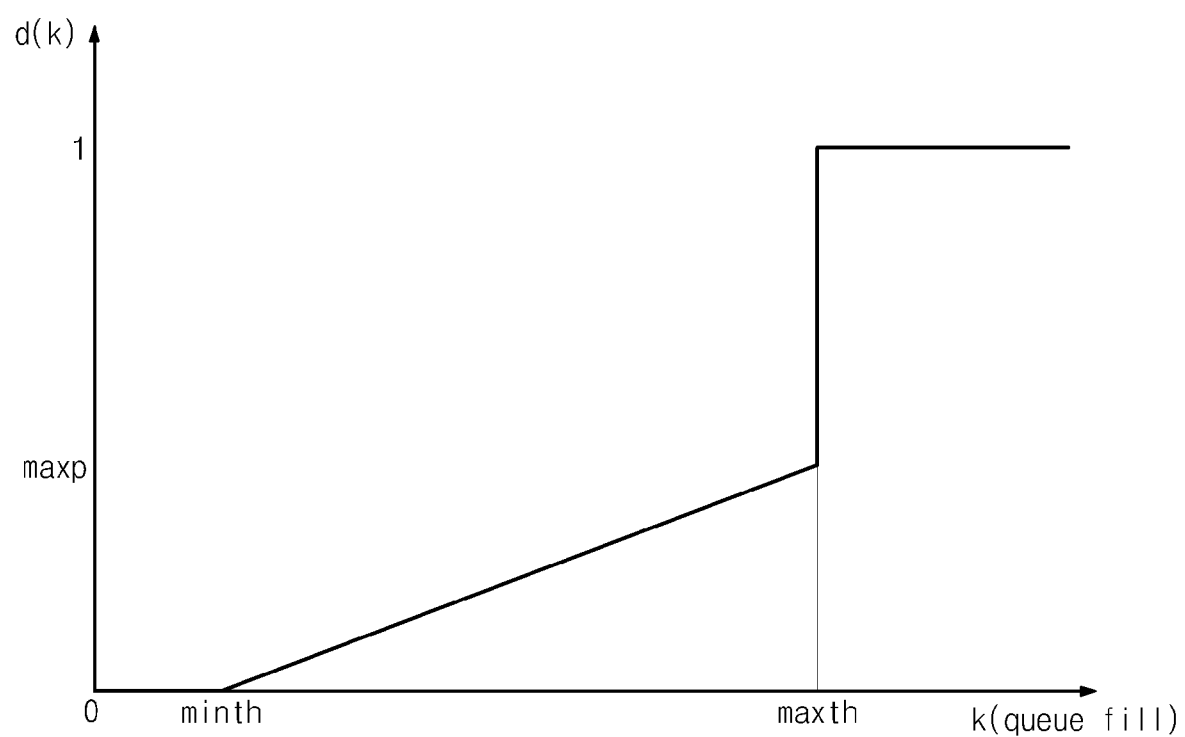
FIG. 5 is a graph showing a drop function with respect to an average queue size in a random early drop (RED).

FIG. 5 is a graph showing a drop function with respect to an average queue size in a random early drop (RED). Referring to FIG. 5, a drop function d (k) of the random early drop (RED) is represented by the drop probability with respect to an average queue size (k). To inform a congestion state by discarding a packet, an average queue size is maintained to be small to accommodate burst traffic.

An RED algorism calculates an average queue size (k) using an exponential weighted moving average (EWMA) and a low pass filter. The calculated average queue size (k) is compared with two critical values (minimum critical value and maximum critical value). If the average queue size (k) is smaller than the minimum critical value, all the packets are passed. If the average queue size (k) is greater than the maximum critical value, all the packets are discarded. If the average queue size (k) is between the minimum critical value and the maximum critical value, the packet are discarded according to the drop probability d (k).

A mathematical formula 1 below represent the random early drop function illustrated in FIG. 5.

$$d(k) = 0, \text{ if } k < min_t h \quad \text{[mathematical formula 1]}$$
$$d(k) = 1, \text{ if } k > max_t h$$
$$d(k) = max_p \left[ \frac{k - min_t h}{max_t h - min_t h} \right], \text{otherwise}$$

Referring to the mathematical formula 1 and FIG. 5, the average queue size determines the degree of burst of traffic. The drop function d (k) representing the drop probability determines how often the packets are discarded. Thus, the drop probability should be determined so that a bias of burst traffic or a global synchronization does not occur by equally discarding the packets while an average queue size is sufficiently often controlled. The minimum critical value should be large to increase the link usage. It is important to find a WRED parameter value satisfying those conditions.

Figure 6:
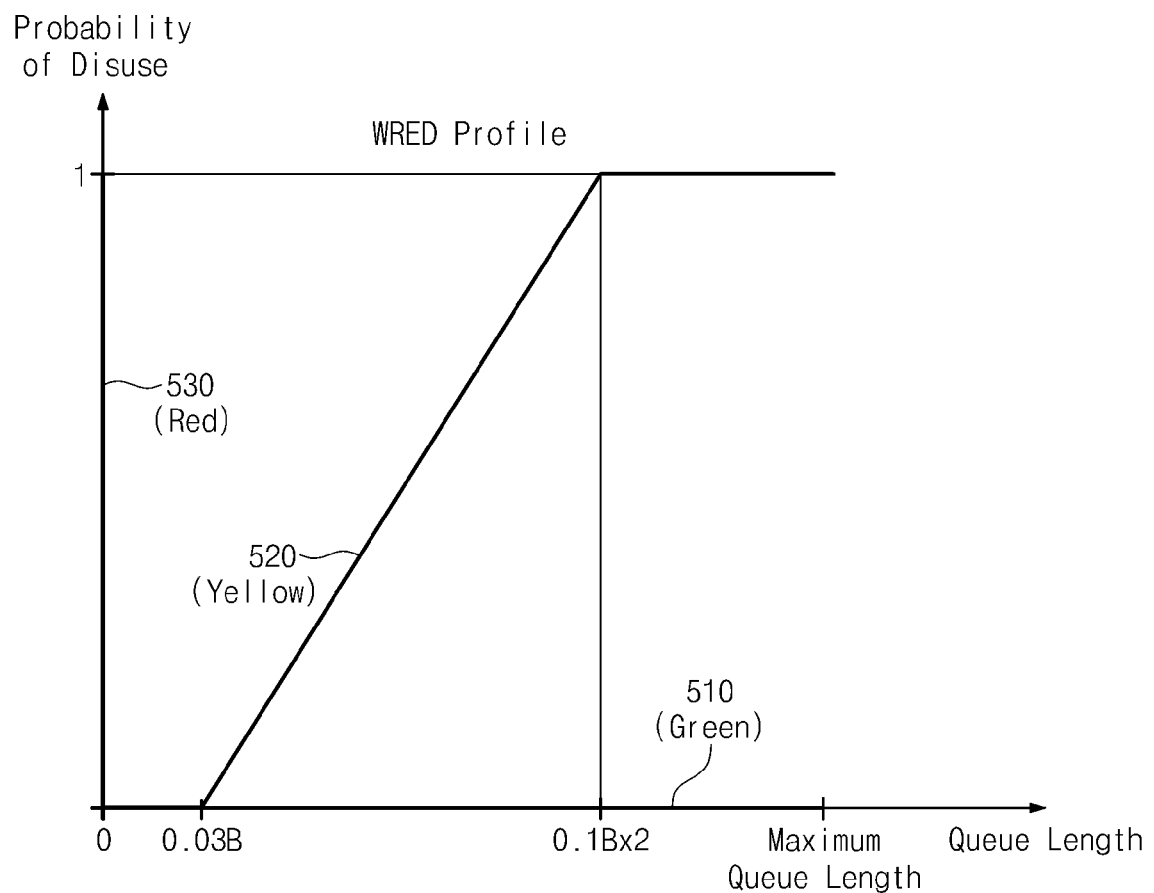
FIG. 6 is a graph showing a profile of weighted random early drop (WRED) in accordance with some embodiments of the inventive concept.

FIG. 6 is a graph showing a profile of weighted random early drop (WRED) in accordance with some embodiments of the inventive concept. Referring to FIG. 6, a drop function considering a global synchronization phenomenon according to the WRED parameter of the inventive concept is disclosed.

A mathematical formula 2 below represent the weighted random early drop (WRED) parameter illustrated in FIG. 6.

$$EWMA = \frac{10}{B} \quad \text{[mathematical formula 2]}$$
$$B = \frac{\left[ \frac{link\ capacity}{8} \right]}{1500}$$

The EWMA represents an exponential weighted movement average and the B represents a bandwidth of output link in a packet of MTU size.

On the basis of the WRED parameter described above, a WRED parameter with respect to the OAM packet of the inventive concept is as follows. The WRED parameter of the inventive concept may be set to different values by a marking result of packet.

[Mathematical Formula 3]
* green packet
The minimum critical value (Minth): 0
The maximum critical value (Maxth): maximum queue size
The maximum drop probability: 0%
[Mathematical Formula 4]
* yellow packet
The minimum critical value (Minth): 0.03B
The maximum critical value (Maxth): 0.1B×2
The maximum probability: 100%
[Mathematical Formula 5]
* red packet
The minimum critical value (Minth): 0
The maximum critical value (Maxth): 0
The maximum drop probability: 100%

A marking color of packet represents a characteristic of packet. That is, in a marking step, a packet is divided into 'conformation', 'excess' and 'violation' on the basis of a polishing parameter such as CBS, EBS/PBS, CIR and EIR/PIR, and then is marked by 'green', 'yellow' and 'red'.

According to the WRED profile optimized to solve the reduction of process rate and the increase of error rate due to a global synchronization between CCM packet and data, the green packet 510 is not discarded. The green packet 510 is set to the maximum queue size (or length) allowing the maximum critical value (Maxth) so that all the green packets 510 are transmitted. The maximum drop probability is set to 0.

The yellow packet 520 has a curve similar to the conventional WRED parameter. However, a burstness of traffic becomes large considering CCM packet of OAM. The maximum critical value (Maxth) is set to 0.1B×2 which is different from the conventional WRED parameter.

The red packet 530 is set to a WRED parameter for discarding all the red packets. That is, the maximum critical value (Maxth) of the red packet 530 is set to 0 and the maximum drop probability of the red packet 530 is set to 1.

Although not illustrated in FIG. 6, there is a response to the case that an overflow traffic greater than the link capacity is applied. If overflow traffic is generated, a pause frame is generated and the network process 212 sends a signal notifying a full state to the MAC chip 211. Then, the MAC chip 211 does not receive a packet any more. At this time, the WRED is applied to a queue level corresponding to a physical port so that a packet transmission is prevented from being stop and a packet as much as the link capacity is transmitted and the rest traffics are discarded.

Figure 7:
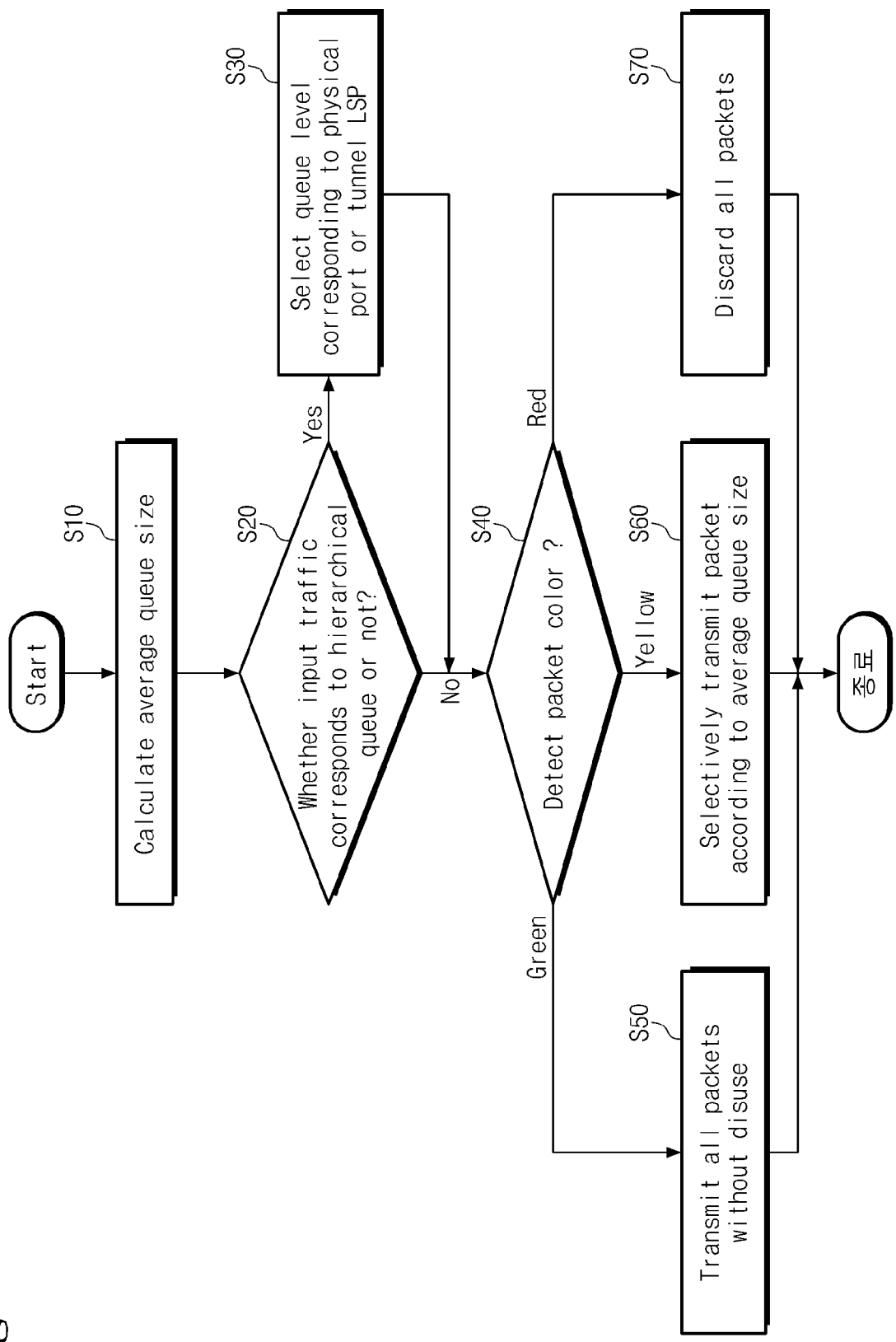
FIG. 7 is a flow chart for explaining a function of traffic congestion avoidance block of traffic manager of the inventive concept.

FIG. 7 is a flow chart for explaining a function of traffic congestion avoidance block of traffic manager of the inventive concept. Referring to FIG. 7, a method of the inventive concept for solving a problem due to a global synchronization between the CCM packet and data packet and a problem due to overflow traffic is sequentially described.

In S10, if traffic is input to a line card, a traffic manager TM calculates an average queue size of input traffic.

In S20, it is checked whether a traffic manager is based on a hierarchical queue or not. The hierarchical queue classifies a structure of input traffic into a plurality of layers of tree form and controls traffic by each classified layer. A packet is classified by IP information of packet or VLAN ID and is assigned to a queue of flow level. After that, a hierarchical control is performed in a manner that queues of several flow levels are bounded to be assigned to one tunnel level queue.

If an input traffic is not a hierarchical queue, a process moves to S40 for applying the WRED on an input traffic. If an input traffic corresponds to a hierarchical queue, a process moves to S30 for solving an overflow with respect to an input traffic and a problem due to a global synchronization.

In the S30, a traffic manager applies the WRED on a queue level corresponding to a physical port and a queue level corresponding to a tunnel LSP to solve an overflow with respect to an input traffic and a problem due to a global synchronization.

In the S40, a marking result of a input packet is detected. That is, a color marked in the packet is detected. If the color of packet is green, a process moves to S50. If the color of packet is yellow, a process moves to S60. If the color of packet is red, a process moves to S70.

In the S50, a WRED parameter with respect to the green packet is set. A parameter like the mathematical formula 3 is set on the green packet. In case of the green packet, the minimum critical value (Minth) is set to 0, the maximum critical value (Maxth) is set to a maximum queue length and the maximum drop probability is set to 0%. That is, the green packet is set so that all the green packets are transmitted without being discarded.

In the S60, a WRED parameter with respect to the yellow packet is set. A parameter like the mathematical formula 4 is set on the yellow packet. In case of the yellow packet, the minimum critical value (Minth) is set to 0.03B, the maximum critical value (Maxth) is set to 0.2B and the maximum drop probability is set to 100%. Permissible level two times as large as the maximum critical value of the conventional WRED parameter may be set on the yellow packet considering CCM packet which is OAM packet.

In the S70, a WRED parameter with respect to the red packet is set. A parameter like the mathematical formula 5 is set on the red packet. In case of the red packet, the minimum critical value (Minth) and the maximum critical value (Maxth) are set to 0 and the maximum drop probability is set to 100%. That is, the red packet is set so that all the red packets are discarded.

Figure 8:
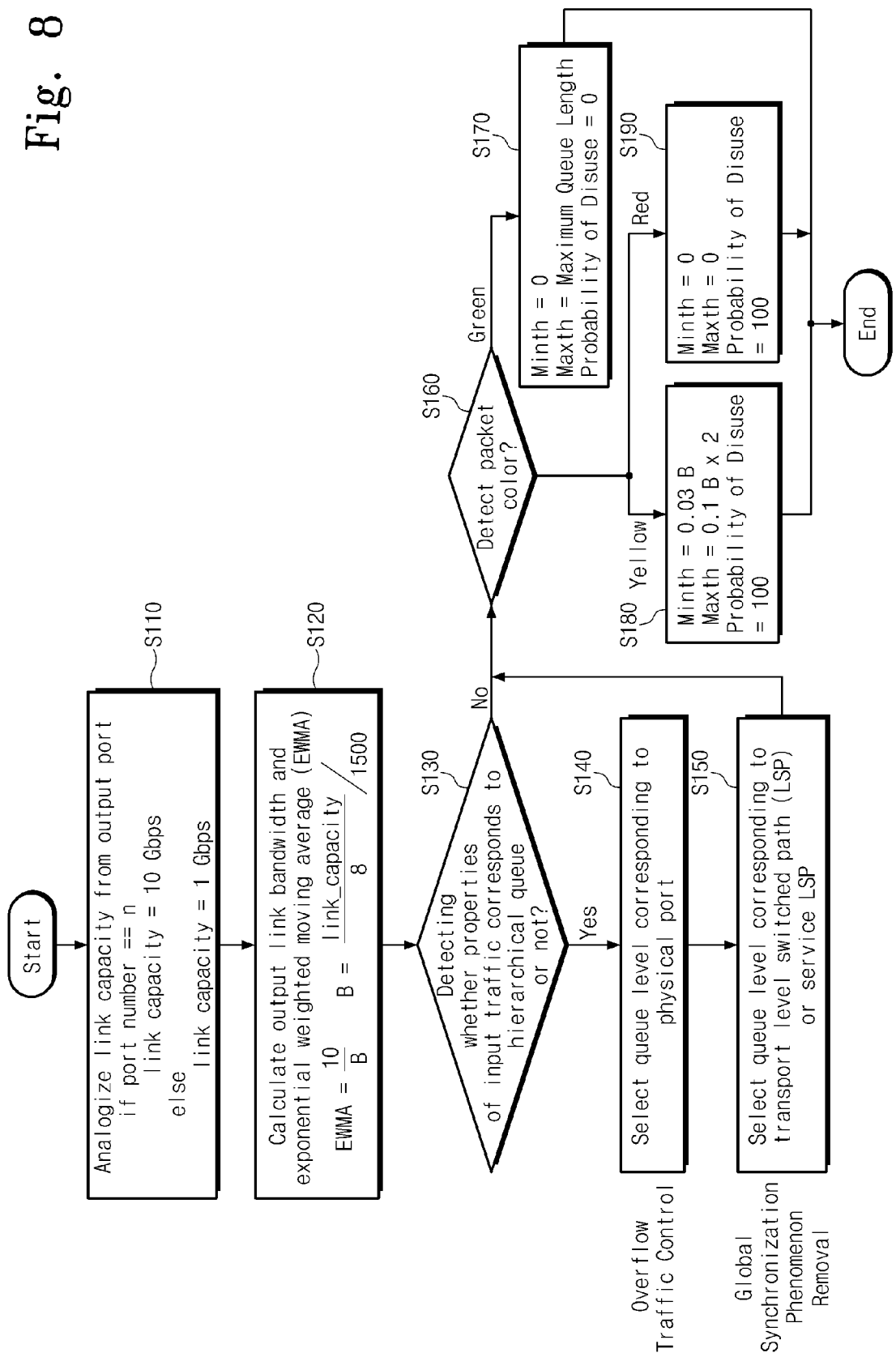
FIG. 8 is a flow chart illustrating a function of traffic manager in detail.

FIG. 8 is a flow chart illustrating a function of traffic manager in detail. Referring to FIG. 8, a method of the inventive concept for solving a problem due to a global synchronization between the CCM packet and data packet and a problem due to overflow traffic is sequentially described.

In S110, if traffic is input to a line card, a traffic manager TM will analogize link capacity from an output port. If assume that a port number assigned to 10 Gbps among a plurality of ports is n, a link capacity may be analogized depending on whether or not an output port number is 0. If an output port number is not 0, a link capacity may be analogized to be 1 Gbps.

In S120, an exponential weighted moving average (EWMA) and an output link bandwidth B are calculated. The exponential weighted moving average (EWMA) and the output link bandwidth B are provided to be the mathematical formula 2.

In S130, it is detected whether the traffic manager is based on a hierarchical queue or not. If the traffic manager is a hierarchical queue, a process moves to S140 for controlling overflow traffic. If the properties of input traffic are not a hierarchical queue, a process moves to S160 for solving a problem of a global synchronization between the CCM packet and data packet.

In S140, to control overflow traffic, a level of queue is selected to be a level corresponding to a physical port. For example, a level 1 may be selected as a port for processing traffic.

In S150, a level of queue is assigned to a level corresponding to a level switched path (LSP) or a service LSP. After selecting a level of queue, a process moves to S160 for applying a WRED according to a packet color.

In S160, detection for packet color is accomplished. If the packet color is green, a process moves to S170. If the packet color is yellow, a process moves to S180. If the packet color is red, a process moves to S190.

In S170, In the S50, a WRED parameter with respect to the green packet is set. A parameter like the mathematical formula 3 is set on the green packet. In case of the green packet, the minimum critical value (Minth) is set to 0, the maximum critical value (Maxth) is set to a maximum queue length and the maximum drop probability is set to 0%.

In S180, a WRED parameter with respect to the yellow packet is set. A parameter like the mathematical formula 4 is set on the yellow packet. In case of the yellow packet, the minimum critical value (Minth) is set to 0.03B, the maximum critical value (Maxth) is set to 0.2B and the maximum drop probability is set to 100%.

In S190, a WRED parameter with respect to the red packet is set. A parameter like the mathematical formula 5 is set on the red packet. In case of the red packet, the minimum critical value (Minth) and the maximum critical value (Maxth) are set to 0 and the maximum drop probability is set to 100%.

Figure 9:
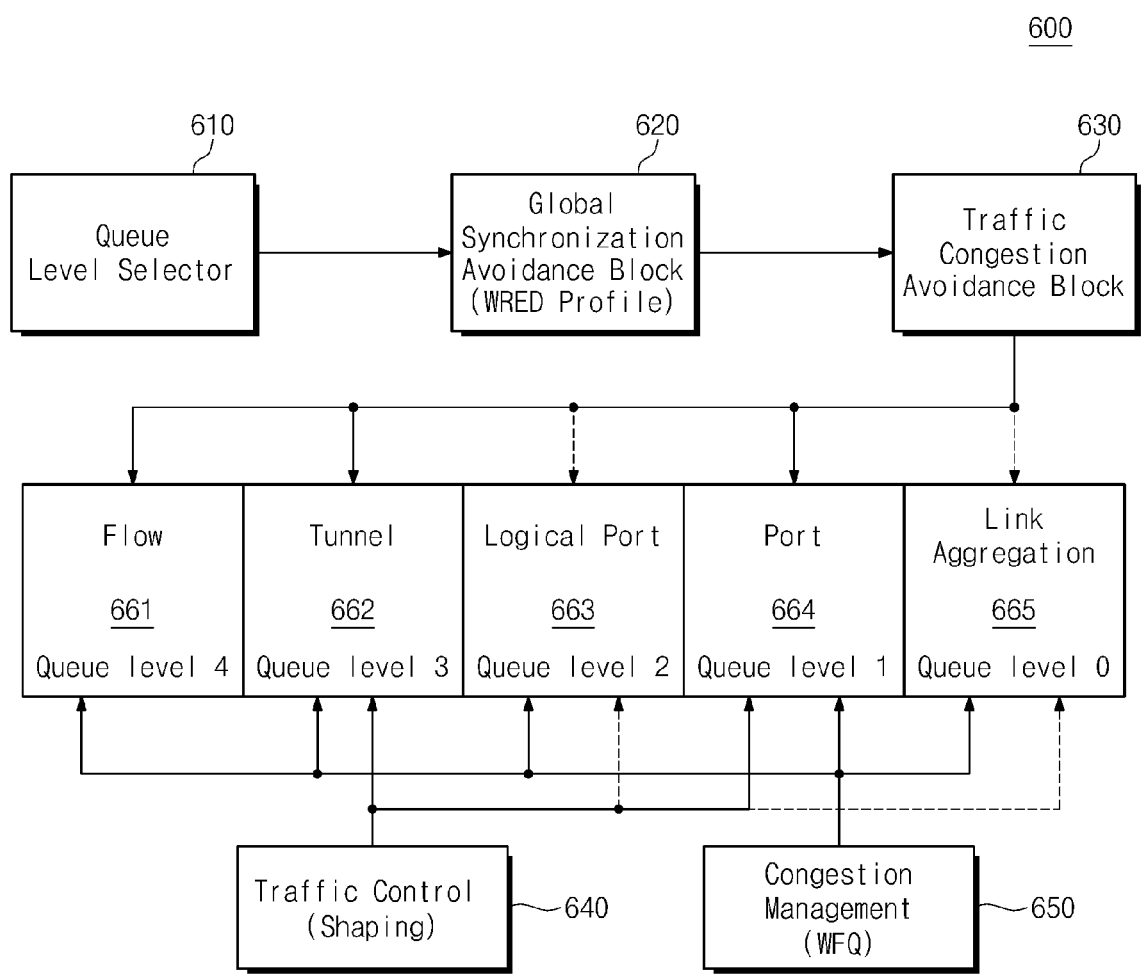
FIG. 9 is a block diagram illustrating a traffic manager 600 performing a function of FIG. 8.

FIG. 9 is a block diagram illustrating a traffic manager 600 performing a function of FIG. 8. Referring to FIG. 9, in the traffic manager 600, properties of queue with respect to traffic being input by a queue level selector 610 is determined. In a global synchronization avoidance block 620, the drop probability with respect to input packets according to the WRED profile described in FIG. 6 is determined. In a traffic congestion avoidance block 630, a port, a tunnel, a flow, a link aggregation, etc is selected.

In a traffic control block 640, a shaping function is performed on a selected tunnel. In a congestion management block 650, a congestion management function is performed on each of queue levels (queue level 0~queue level 4).

According to some embodiments of the inventive concept, a problem of reduction of packet processing rate and an increase of error rate can be solved when operating QoS, OAM, and protection functions at the same time to guarantee stability of packet transport system and survival of network. Also, a problem of packet transmission stop due to overflow traffic more than link capacity is solved. To prevent packet loss due to a global synchronization phenomenon between OAM packet and data packet, a WRED parameter of traffic manager is optimized.

A link bandwidth is calculated according to a link capacity of each port and a WRED is applied to a queue level corresponding to a physical port and a queue level corresponding to LSP. A parameter of WRED applies different profiles according to color. The method of the inventive concept can improve performance and stability of packet transport system by preventing a global synchronization phenomenon between OAM packet and data packet and controlling overflow traffic.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the present invention. Accordingly, all such modifications are intended to be included within the scope of the present invention as defined in the claims. The present invention is defined by the following claims, with equivalents of the claims to be included therein.

What is claimed is:

1. A method of managing traffic of a packet transport system, comprising:
   calculating an average queue size of input traffic with reference to a link capacity;
   differently applying allowable length and drop probability with respect to the calculated average queue size according to one or more marked colors of input packets,
   wherein the input traffic includes a continuity check message (CCM) packet for operation, administration and maintenance (OAM);
   checking whether a traffic manager is based on a hierarchical queue or not,
   wherein if it is checked that the traffic manager is based on the hierarchical queue, the allowable length and drop probability with respect to the average queue size are differently applied according to the marked colors of input packets;
   applying a weighted random early drop (WRED) algorithm to a queue level corresponding to a physical port of the input packet when the traffic manager is based on the hierarchical queue; and
   applying the WRED algorithm to a queue level corresponding to a transmission level switch path (LSP) or a service LSP of the input packet.

2. The method of managing traffic of the packet transport system of claim 1, wherein if the input packet is marked green, all the packets are transmitted.

3. The method of managing traffic of the packet transport system of claim 1, wherein if the input packet is marked red, all the packets are discarded.

4. The method of managing traffic of the packet transport system of claim 1, wherein if the input packet is marked yellow, a maximum critical value of the allowable length is set to 0.2 times a bandwidth of an output link.

5. A packet transport system, comprising:
   a queue level selector calculating an average queue size of input traffic with reference to a link capacity to select a queue level;
   a global synchronization avoidance block differently applying allowable length and drop probability with respect to the calculated average queue size according to a marked colors of input packets, wherein the global synchronization avoidance block applies a weighted random early drop (WRED) algorithm to a queue level corresponding to a tunnel level switch path (LSP) of the input packet; and
   a traffic congestion avoidance block applying the WRED to a queue level corresponding to a physical port of the input packet when a traffic manager is based on a hierarchical queue, and if the traffic manager is based on the hierarchical queue, the allowable length and drop probability with respect to the average queue size are differently applied according to the marked colors of input packets.

6. The packet transport system of claim 5, wherein if the input packet is marked green, the global synchronization avoidance block transmits all the input packets.

7. The packet transport system of claim 5, wherein if the input packet is marked red, the global synchronization avoidance block discards all the input packets.

8. The packet transport system of claim 5, wherein if the input packet is marked yellow, the global synchronization avoidance block sets a maximum critical value of the allowable length to 0.2 times a bandwidth of an output link.

* * * * *